United States Patent [19]

Harris et al.

[11] Patent Number: 5,332,169
[45] Date of Patent: Jul. 26, 1994

[54] METHOD OF PREVENTING CLOCKSPRINGING OF A WOUND WEB WITHIN A CASSETTE

[75] Inventors: Clark E. Harris, Fairport; Raymond D. Hulbert, Penfield; Andrew E. Dominesey; Thomas C. Healey, both of Rochester; Joel R. Shaw, Fairport, all of N.Y.

[73] Assignee: Eastman Kodak Company, Rochester, N.Y.

[21] Appl. No.: 955,552

[22] Filed: Oct. 1, 1992

[51] Int. Cl.[5] .......................................... G03B 17/26
[52] U.S. Cl. ................................. 242/611; 206/397; 354/275; 242/598
[58] Field of Search ............... 242/71.1, 71.7, 55.2, 242/55.53, 194, 197; 206/408, 409, 397; 354/275

[56] References Cited

U.S. PATENT DOCUMENTS

| | | | |
|---|---|---|---|
| 1,825,822 | 10/1931 | Rundell | 242/55.2 |
| 2,240,109 | 4/1941 | Balwin et al. | 242/55.2 |
| 2,410,328 | 10/1946 | Agamaite, Jr. | 242/55.2 |
| 3,831,881 | 8/1974 | Tucker | 242/194 |
| 3,920,198 | 11/1975 | Sutliff | 242/194 |
| 4,033,523 | 7/1977 | Roman | 242/198 |
| 4,398,814 | 8/1983 | Muylle et al. | 354/275 |
| 4,802,633 | 2/1989 | Beery | 242/71.1 |
| 4,830,305 | 5/1989 | Giiggi et al. | 242/71.7 |
| 4,903,833 | 2/1990 | Beery | 206/407 |
| 5,126,774 | 6/1992 | Loewe et al. | 242/71.1 |

OTHER PUBLICATIONS

Item No. 16352 published in the Nov., 1977 issue of Research Disclosure.

Primary Examiner—Daniel P. Stodola
Assistant Examiner—John Q. Nguyen
Attorney, Agent, or Firm—Clyde E. Bailey

[57] ABSTRACT

A method of preventing clockspringing of a web wound inside a cassette (10) having a tubular web core (12) onto which is wound a web (14) of photosensitive material to form a web roll. The web roll is housed within a substantially rectangular jacket (16) which has a exit slot (20) extending substantially from one side edge of the jacket (16) through which the web (14) may be drawn from the cassette (10). Moreover, cassette (10) comprises a pair of end caps (22) having tubular hub members (25) insertable over opposite ends of tubular core opening (39) defined by sleeve portion (38) of tubular web core (12) for rotatably supporting tubular web core (12). In the preferred embodiment, each hub member (25) has at least one flexible lock (44) at the free end thereof such that when the flexible lock (44) rotatably engages core grooves (36), separation of the end caps (22) from the jacket (16) is prevented. Furthermore, a substantially flat, H-shaped fork (42), having at least one flexible camming ramp (40) on one end and graspable pinch fingers (46) exposed thorough the hub member (25) on the opposite end is mounted within at least one the hub members (25) to prevent rotation of the web core (12).

3 Claims, 6 Drawing Sheets

METHOD OF PREVENTING CLOCKSPRINGING OF A WOUND WEB WITHIN A CASSETTE

FIELD OF THE INVENTION

The present invention relates generally to a method of preventing clockspringing, and more particularly, to a method of preventing clockspringing of a wound roll of web material within a cassette.

BACKGROUND OF THE INVENTION

In various cassettes now in use for webs of photosensitive film and paper, the web is wound on a spool or core, with or without flanges, and is disposed within a cassette which totally surrounds the web and protects it from light and other damaging effects. One end of the web is normally secured to the core or spool center, and the other end extends out of the cassette through an exit slot therein. The other end of the web is fastened to the surface of the cassette, and is released therefrom for insertion into a camera or the like. It has been found that there is a tendency for the web in such cassettes to unwind during handling and shipping. Inasmuch as the inner end of the web is connected to the core or the spool center, and the other end is normally secured to the outer surface of the cassette, the web acts as a released clockspring, turning the spool as it unwinds. Such web clockspringing can result in scratching of the surface of adjacent web convolutions, causing a deterioration in the quality of the image that may be recorded thereon. In other instances the web can clockspring outwardly to the extent that the outer convolution of web jams against the inner surface of the cassette, making subsequent unreeling of the web difficult or impossible. In those situations in which the outer end of the web is not fastened to the surface of the cassette or is inadvertently released from the cassette surface, the clockspringing can cause the outer end of the web to be pulled back through the slot into the cassette, resulting in a cartridge that is completely unusable.

Various attempts have been made to provide a method of preventing clockspringing, i.e, unwinding of the web in cassettes. For example, one such method using a core locking device for a web dispensing cassette is disclosed and published as Item No. 16352 in the November 1977 issue of Research Disclosure. In this core-locking device, the web winding core is provided with a slotted end, and a core-locking member is provided that is captive and slidable in one of the two end caps of the cassette. In U.S. Pat. No. 3,831,881, an anti-backup device is disclosed comprising a fork-like member located within a hollow core on a rotatable film take-up core. The control member has flexible outwardly extending arms projecting from a body portion. In an engaged position of the control member, the arms thereof slide over internal cam or ratchet surfaces of the take-up core during rotation of the core in the forward (take-up) direction, and hence permits such rotation. On the other hand, these arms engage the cam or ratchet surfaces of the core post to block rotation of the core when an attempt is made to rotate the core in the reverse (unwinding) direction. When the film cartridge is placed within a camera, the fork-like member can be moved axially until it is out of engagement with the camera ratchet surfaces, thereby permitting free rotation of the core in both the forward and reverse directions. In U.S. Pat. No. 4,756,418, an anticlockspringing apparatus is disclosed comprising a clip separate from the core and cassette, having opposite ends thereof insertable through aligned notches and slots in the core and cassette respectively, for locking the core to the cassette.

Therefore a need exist for a method of preventing anticlockspringing of a wound web in a cassette that is easy to assemble, and thus economical to manufacture.

SUMMARY OF THE INVENTION

It is, therefore, an object of the present invention to provide a method of preventing clockspringing of web wound in a cassette that is of simple design and construction, thoroughly efficient and reliable in operation, and economical to manufacture. Accordingly, for accomplishing these and other objects of the invention, there is provided a method for preventing clockspringing of a wound roll of web material within a cassette during storage and shipment, in which the roll of web material is wound on a central tubular core having an inner peripheral surface arranged to rotate on axially aligned central tubular hub members on a pair of cassette end caps, comprising the steps of:

providing at least one flexible lock on at least one of said hub member in sliding engagement with said sleeve portion of said web core; and slidably mounting at least one flexible fork having a graspable finger on one end and camming ramps on the opposite end within the hub member for movement between a core-braked position in which the camming ramps engage and forces said flexible lock into braking engagement with a core groove inside said sleeve portion for preventing rotation of said web core and clockspringing of the roll of web material, and a cored-released position in which said camming ramp releases said flexible lock from said core groove to allow rotation of said web core and roll of web material.

BRIEF DESCRIPTION OF THE DRAWINGS

The foregoing as well as other objects, features and advantages of this invention will become more apparent from the appended FIGURES wherein like reference numerals denote like elements, and wherein.

DETAILED DESCRIPTION OF THE INVENTION

Figure 1:
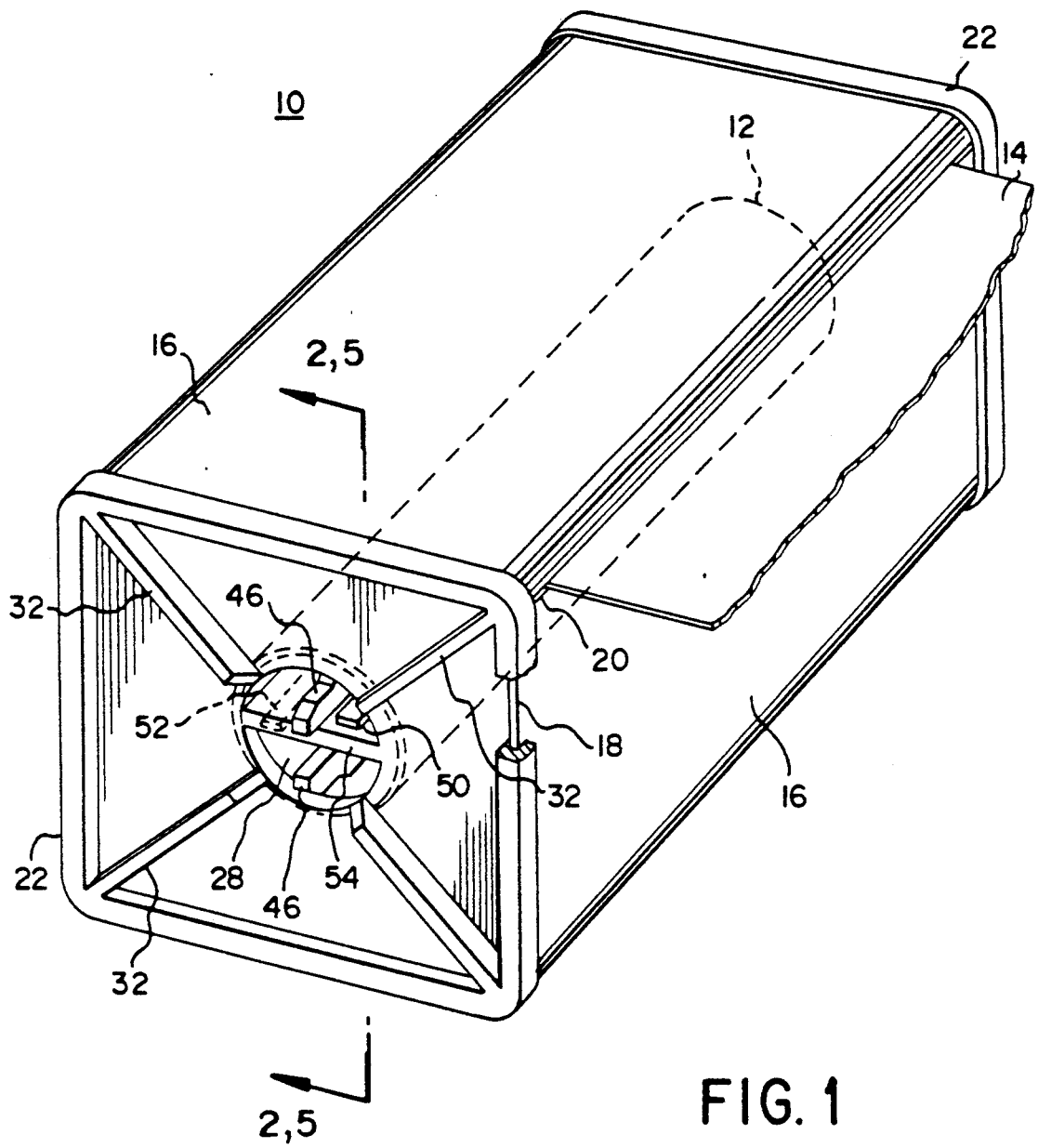
FIG. 1 is a perspective view of a preferred embodiment of a web cassette according to the present invention.
Figure 2:
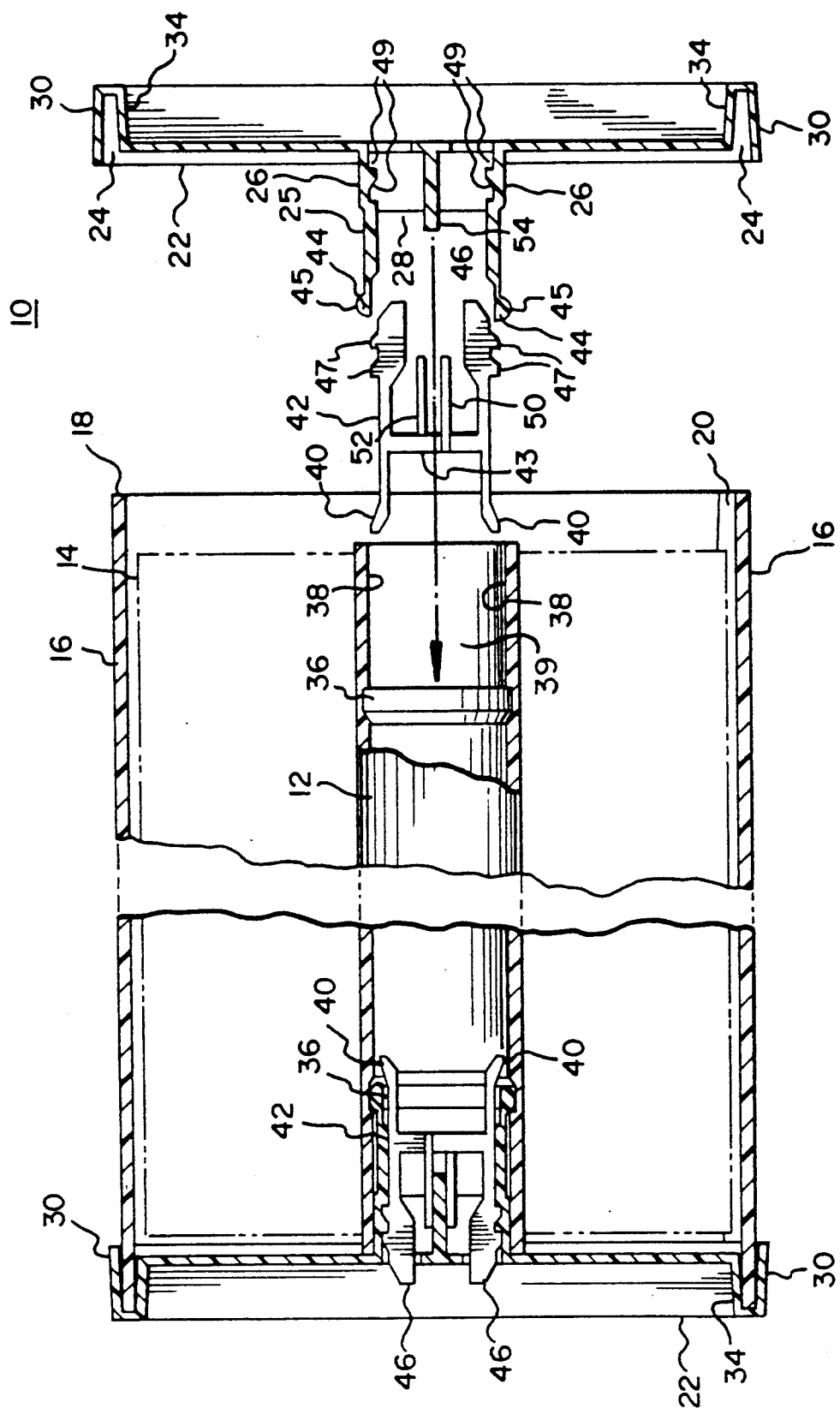
FIG. 2 is a sectional view, partially exploded of a preferred embodiment of the present invention.

With reference to FIGS. 1 and 2. a preferred embodiment of the web cassette 10 of this invention comprises a substantially tubular web core 12, onto which is wound a web 14 of photosensitive material to form a web roll. The web roll is housed within a substantially rectangularly shaped jacket 16 having side edges 18. The jacket 16 has a peripheral web exit slot 20 extending substantially from one side edge thereof to the other, through which the web 14 may be drawn from web cassette 10.

Figure 3:
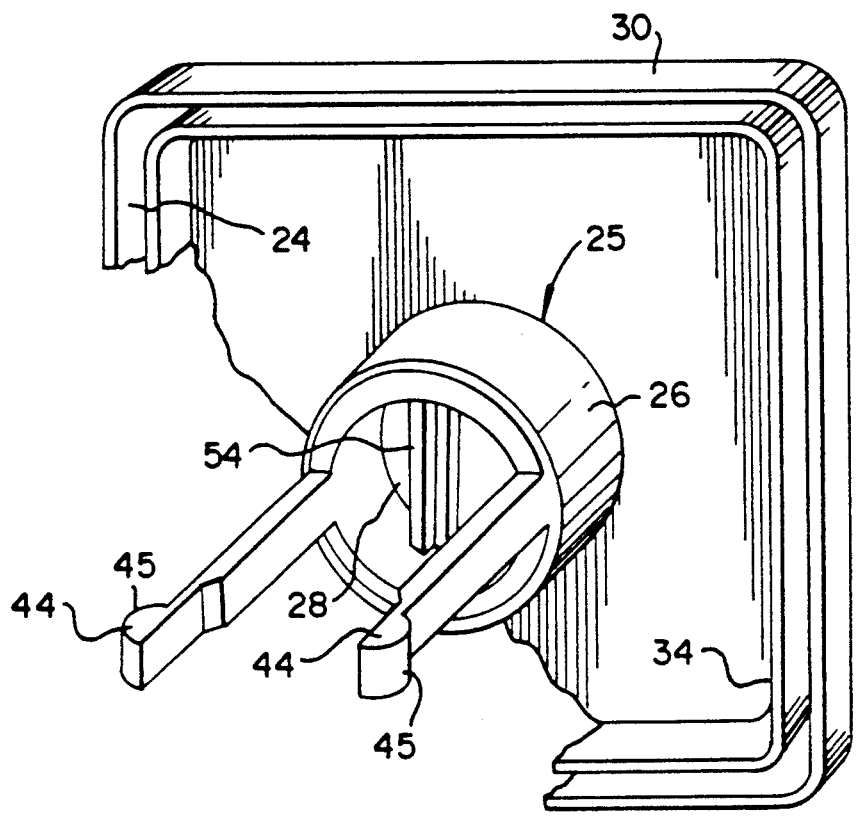
FIG. 3 is a perspective view, partially broken away, of the end cap of the invention.
Figure 4:
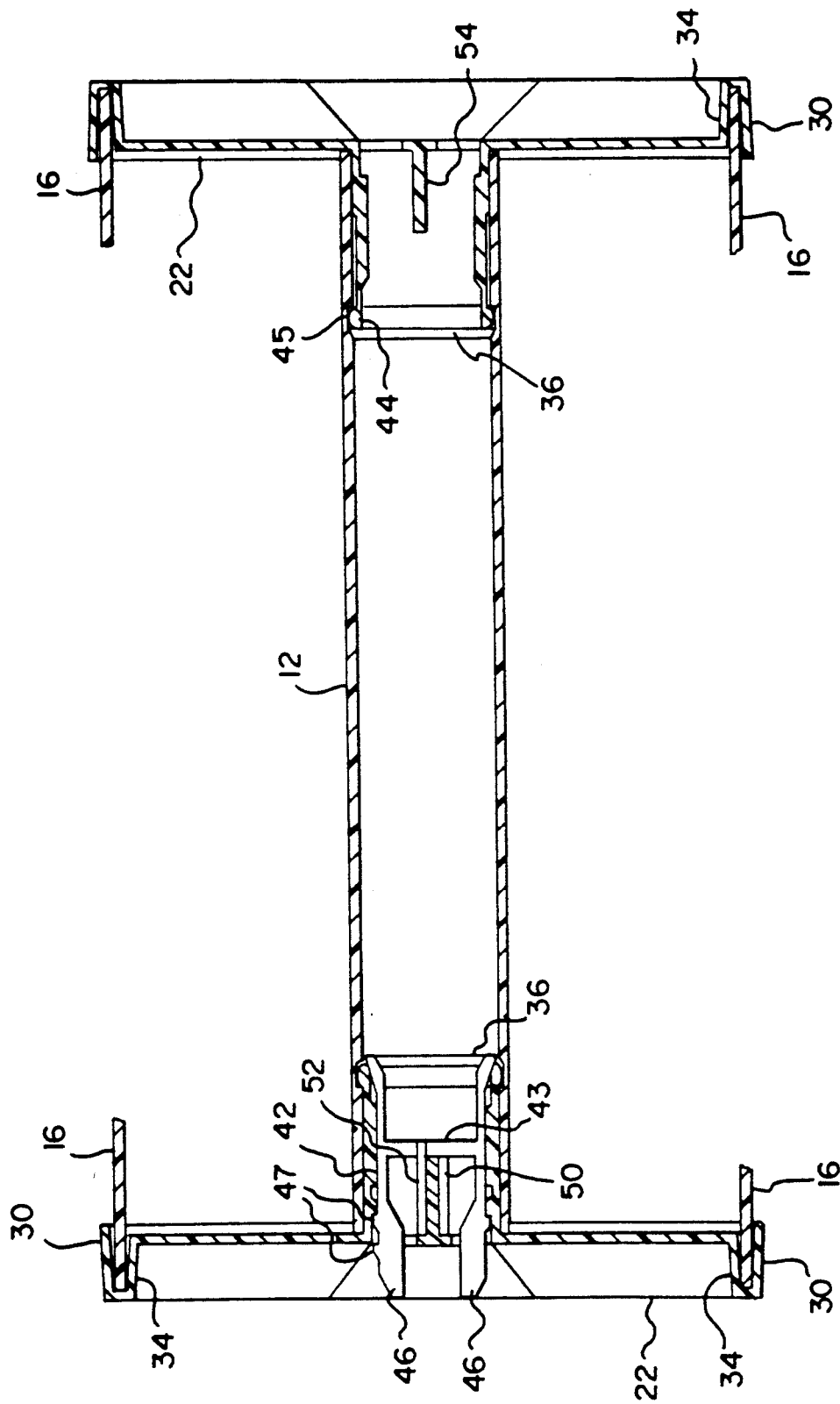
FIG. 4 is a sectional view of the anti-clockspringing means of the invention in its locked position for shipping taken along line 2—2 line of FIG. 1.

Web cassette 10 is provided with a pair of identical end caps 22, each having a peripheral recess 24 for receiving a side edge 18 of jacket 16, as best seen in FIGS. 2 and 3. End caps 22 comprise a tubular hub member 25 having an outer cylindrical wall 26 defining a center opening 28, and a peripheral bifurcated outer wall 30 defining the recess 24, as best seen in FIG. 3. A plurality of strengthening ribs 32 (FIG. 1) radially extends from the inner wall 34 (FIG. 2) of end caps 22 to the outer wall 30 of end caps 22.

A single tubular web core 12, preferably plastic, supports the spooled web roll, and has internal core grooves 36 (FIGS. 2, 4, 5 and 16) located substantially near each end of web core 12 for securing end caps 22 onto side edges 18 of jacket 16. Each end of web core 12 has a sleeve portion 38 defining a core opening 39 which engages the outer cylindrical wall 26 of hub member 25 of end caps 22 (FIG. 2). The sleeve portion 38 acts as a light lock and a bearing surface during web roll rotation while in contact with cylindrical wall 26 of hub member 25.

Figure 5:
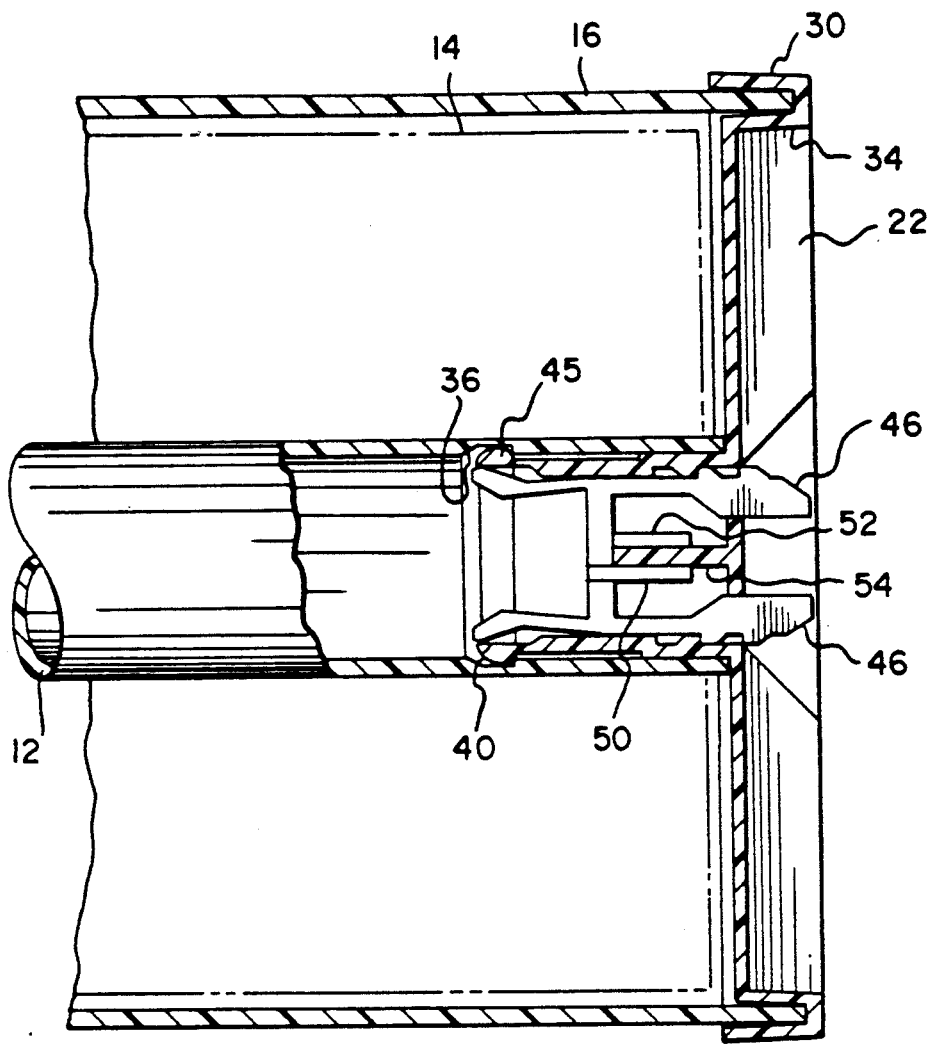
FIG. 5 is a partial section view along line 5—5 of FIG. 1 showing the fork fully engaged in the core locked position.
Figure 7:
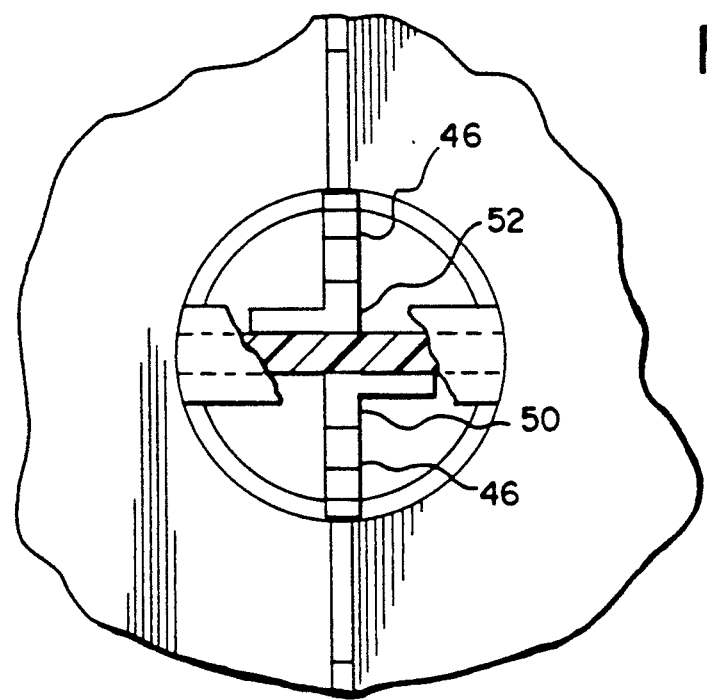
Figure 6:
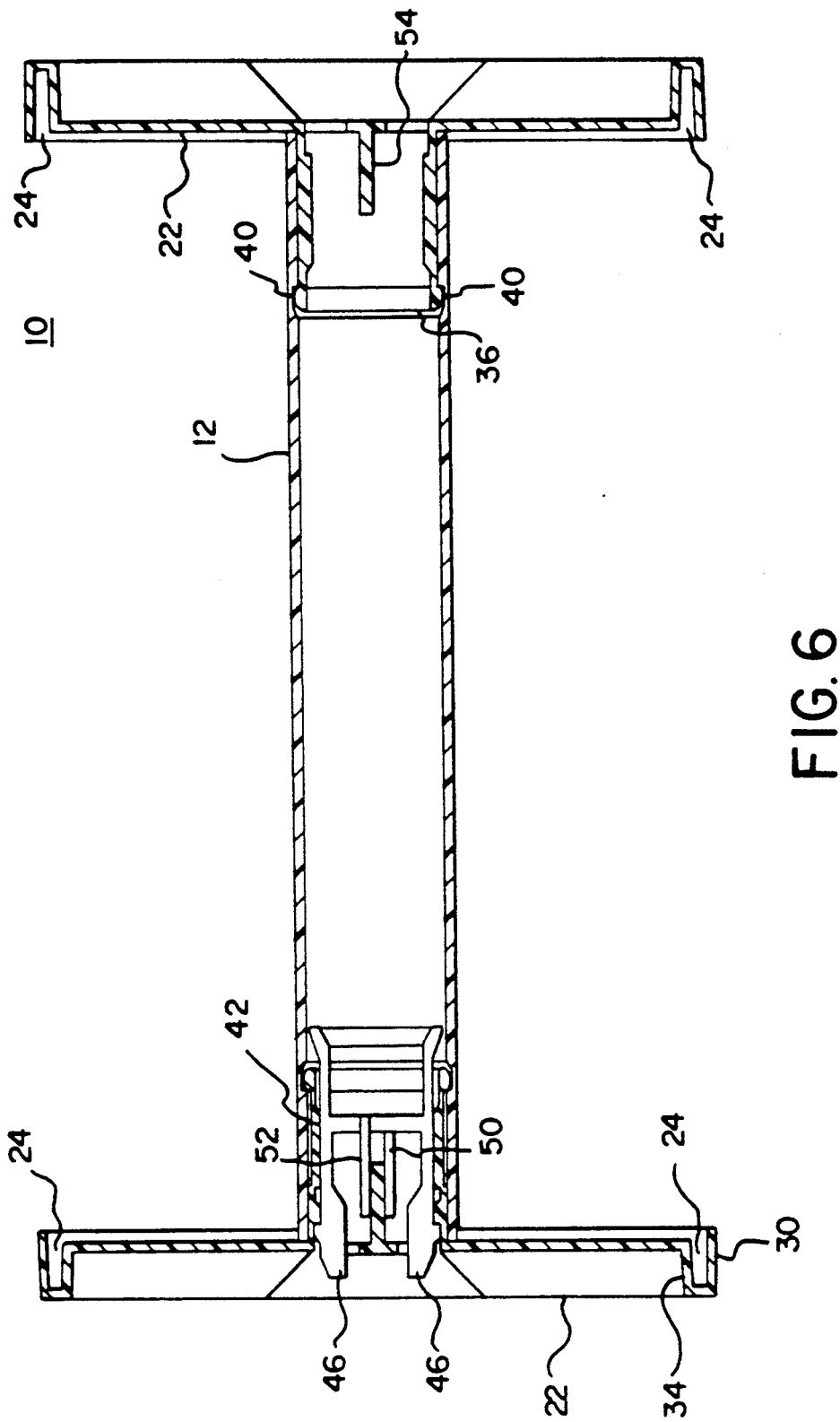
FIG. 6 is a sectional view of the anti-clockspringing means of the invention in its unlocked position; and, FIG. 7 shows a fragmentary elevation view, partially broken away, of the end cap of the invention.

While there are numerous ways to prevent the rotation of end caps 22 relative to web core 12, in the preferred embodiment, a flat substantially H-shaped fork 42 is preferred, having a central member 43, a pair of spaced-apart flexible pinch fingers 46 each extending from one end of the central member 43 and a pair of flexible camming ramps 40 extending from the opposite end of the central member 43 is preferred. A pair of flexible, axially extending locking fingers or locks 44 are provided at diametrically opposite locations on the free end of each hub member 25, each lock 44 including a radially outwardly extending pad 45 at its free end. Flexible camming ramps 40 on fork 42 will press pads 45 radially outward into locking engagement with core grooves 36, as shown in FIG. 5, to prevent rotation of web core 12. When fork 42 is pushed inward, fork 42 slides axially toward the center of web core 12 disappearing into the center opening of the end cap 22 with outer pads 45 of hub member 25 slidably nesting within core grooves 36. Therefore, it should be appreciated that fork 42 is slidably movable between a core-brake position (FIGS. 4 and 5) in which camming ramps 40 on fork 42 engage flexible locks 44 and force outer pads 45 into braking engagement with core groove 36 for preventing rotation of web core 12; and, a core-released position (FIG. 5) in which outer pads 45 are disengaged from core grooves 36 of web core 12. When pinch fingers 46 are compressed toward each other, they disengage from notches 49 on pinch fingers and, fork 42 slidably disengages the camming ramps from flexible locks 44.

Detent means interposed between pinch fingers 46 and hub member 25 releasably hold fork 42 in at least the core-braked position, as best seen in FIGS. 2 and 5. While those skilled in the art will appreciate that any detent means within the definition of the invention may be used, the preferred detent means comprises axially spaced lugs 47 (FIG. 2) on one of the pinch fingers 46 and hub member 25 and a pair of cooperating axially spaced notches 49 on the other pinch finger 46 and hub member 25.

Stabilizing means defined by spaced, radially extended blades 50 and 52 of fork 42 engage with diametral rib 54 in the center opening 28 of the end caps 22 to prevent fork 42 from rotation relative to end caps 22, thus counter acting the force of the clockspringing by the web roll and thereby stabilizing fork 42 within the end cap hub member Accordingly, an important advantage of the method of preventing clockspringing in a web cassette having an anti-clockspringing device of the present invention is that it can be easily assembled without having to staple together the mating edges of the end caps and jacket side edges, thereby resulting in reduced cost of manufacturing.

The invention has been described in detail with particular reference to a preferred embodiment thereof, but it will be understood that variations and modifications can be effected within the scope of the invention.

What we claim is:

1. A method for preventing clockspringing of a wound roll of web material within a cassette during storage and shipment, in which the roll of web material is wound on a web core having sleeve portions arranged to rotate on axially aligned central tubular hub members on a pair of cassette end caps, one hub member being provided on each end cap, comprising the steps of:

providing at least one flexible lock on at least one of said hub member in sliding engagement with the respective sleeve portion of said web core; and slidably mounting at least one flexible fork having a graspable finger on one end and camming ramps on the opposite end within the hub member for movement between a core-braked position in which the camming ramps engage and forces said flexible lock into braking engagement with a core groove inside said sleeve portion for preventing rotation of said web core relative to said end caps and clockspringing of the roll of web material, and a core-released position in which said camming ramp releases said flexible lock from said core groove to allow rotation of said web core and roll of web material.

2. A method according to claim 1 in which a flexible lock is provided on each hub member, and in which said fork is slidably mounted within each hub member.

3. A method according to claim 2 in which each flexible lock comprises a flexible axially extending outer pad on each hub member biased into engagement with said core groove inside said sleeve portion of said web core.

* * * * *